United States Patent [19]

Widenhofer

[11] 3,921,120
[45] Nov. 18, 1975

[54] FLOAT ACTUATED RELEASE MECHANISM

[75] Inventor: James W. Widenhofer, Jackson, Mich.

[73] Assignee: Sparton Corporation, Jackson, Mich.

[22] Filed: Mar. 29, 1973

[21] Appl. No.: 345,871

[52] U.S. Cl............... 340/2; 9/8 R; 116/124 B
[51] Int. Cl.²................ B63B 21/00; H04B 11/00
[58] Field of Search...... 116/124 B, 114 AH; 340/2, 340/8 S, 8 R; 9/8 R, 9

[56] References Cited
UNITED STATES PATENTS

| | | | |
|---|---|---|---|
| 2,778,332 | 1/1957 | Talbot | 116/124 B |
| 3,093,808 | 6/1963 | Tatnall et al. | 116/124 B X |
| 3,140,886 | 7/1964 | Cotilla et al. | 340/2 |
| 3,220,028 | 11/1965 | Maes | 340/2 x |
| 3,309,649 | 3/1967 | Ballard et al. | 9/8 X |
| 3,646,505 | 2/1972 | Kirby | 340/2 |
| 3,701,175 | 10/1972 | Widenhofer | 9/8 R |

Primary Examiner—Richard C. Queisser
Assistant Examiner—Daniel M. Yasich
Attorney, Agent, or Firm—Beaman & Beaman

[57] ABSTRACT

A sonobuoy deployment system wherein a plurality of sonobuoy components are housed within a casing adapted to be dropped into the water, either from air or marine craft. The casing has a negative buoyancy, and houses a float deployment mechanism activated upon the casing entering the water. Actuation of the float deployment mechanism deforms a metal release plate previously holding a float within the casing, the float inflates, and as the casing sinks in the water the sonobuoy components are deployed from the casing upper end by cable connections attached to the float. Parachute structure may be mounted upon the release plate for automatic separation from the casing upon actuation of the float deployment mechanism. The utilization of a negatively buoyant casing, and deployment of the components from the casing upper end, permits the casing to quickly sink to significant depths, permitting the sonobuoy transducer components to be quickly located at the desired operating depth.

8 Claims, 11 Drawing Figures

FLOAT ACTUATED RELEASE MECHANISM

BACKGROUND OF THE INVENTION

The invention pertains to sonobuoys for detecting underwater craft and other vibration producing means by the use of vibration sensing transducers, and particularly pertains to the deployment of sonobuoy components from a casing, and structure for releasing the components therefrom.

Sonobuoy devices are widely employed for submarine detection purposes, and are also utilized for underwater geological exploration and other submarine purposes. Sonobuoys may be either active, wherein a transmitted signal is produced, and the reflected signal is received and transmitted, or the sonobuoy may be passive wherein received signals are sensed and transmitted.

Sonobuoy devices are normally located as desired by aircraft, or watercraft. When airdropped, sonobuoys normally employ velocity reducing devices such as fins, foils or parachutes in order to retard the velocity of the sonobuoy casing as it falls through the air, and minimize the likelihood of damage as it enters the water. Also, such velocity control devices orient the sonobuoy as it falls through the air such that a predetermined end thereof will initially enter the water.

Upon the sonobuoy entering the water the components thereof, such as the sound producing and/or receiving transducers, transmitters, damping means, and other conventional components are deployed from the casing in order that they might best perform their desired function. With some sonobuoy constructions the sonobuoy casing itself floats upon the water surface and the components are dropped therefrom. This type of device is shown in U.S. Pat. Nos. 3,093,808 and 3,646,505. Other constructions utilize a float which is ejected from the casing, and the components are dropped from the casing to a considerable depth below the float.

With advancing technology permitting submarines to effectively operate at increasingly greater depths, the need for detection sonobuoys operating at increased depths arises, and present specifications often require that the sonobuoy transducer be located in excess of 100 feet below the water surface. It will be appreciated that in sonobuoys wherein the transducer and other components are ejected from the lower end of the casing to freely fall through the water, considerable time lapse occurs before the transducer reaches such operating depths due to the resistance of movement of the components through the water. As the components normally include lengthy wires and coils, including irregularly shaped housings and the like, considerable resistance is produced as the components fall through the water, and the time lapse from water entry until the transmitting of signals at the desired depth may be such that the submarine endeavoring to be located moves beyond effective locating range.

In view of the need for a sonobuoy capable of quickly becoming operative at the desired depth after entry into the water, considerable effort has been expended endeavoring to overcome the inherent problems.

Additionally, in view of the forces imposed upon the air-dropped casing on impact with the water, it is important that positive and dependable release means be associated with the sonobuoy parachute or velocity restraining apparatus to prevent entanglement of the sonobuoy components therewith during deployment. Additionally, release of the sonobuoy components from the casing must be in a positive manner not likely to be adversely affected by the drop conditions. Previously employed release mechanisms have been unduly sensitive, subject to premature release, or prone to bind and not fully release, and were also prone to damage during the drop, resulting in an inoperative sonobuoy.

SUMMARY OF THE INVENTION

It is an object of the invention to provide an improved sonobuoy component deployment system wherein the sonobuoy components may be quickly deployed to considerable depths, and a minimum of resistance to deployment occurs.

A further object of the invention is to provide an improved sonobuoy deployment system wherein a parachute or other velocity restraining device during an air drop may be positively released from the sonobuoy casing upon the sonobuoy entering the water.

An additional object of the invention is to provide sonobuoy structure utilizing an inflatable float or envelope wherein inflation of the envelope simultaneously and positively actuates a release plate permitting the nonbuoyant casing to rapidly sink from the float deploying its components at those predetermined depths desired. In this manner the casing continues to house the components until the components are located at the desired depth, resulting in minimum resistance to component movement during deployment, and minimizing the likelihood of entanglement of components.

Another object of the invention is to provide a sonobuoy deployment system using a sonobuoy casing having a lower end which normally initially engages the water, and is thereby most likely subject to damage, and an upper end through which the sonobuoy components are deployed prior to operation, which is relatively protected from impact.

Another object of the invention is to provide a release plate for a sonobuoy wherein the release plate maintains the sonobuoy components within the sonobuoy casing, and simultaneously serves as the air velocity restraining anchor or connecting member for the casing. Thus, release of the restraining plate simultaneously releases the air restraining member, i.e., parachute, and permits the sonobuoy components to be deployed through the sonobuoy upper end as the sonobuoy sinks through the water.

In the practice of the invention a cylindrical sonobuoy casing of metal, such as aluminum, is provided with a lower end and an upper end. A parachute mounted in the casing upper end is deployed, in an air drop, to restrain the velocity of the casing as it falls through the air. Upon the casing entering the water, actuating means inflate float mechanism adjacent the casing upper end. The energizing of the float mechanism deforms a retaining plate, which also serves as the anchor for the parachute to the casing, and releases the plate from the casing. Thereupon, the float is ejected from the casing upper end, and the nonbuoyant casing falls through the water at an unrestrained velocity. Cables deployed from the float pull the sonobuoy components from the casing at the desired depths, and thus the only relative movement between the sonobuoy structure and the water is the casing itself, which is of a relatively streamlined and low friction configuration. After all of the sonobuoy components have been deployed from the casing, the casing continues to fall clear of the components.

An additional object of the invention is to provide a low cost sonobuoy component release plate which may be economically manufactured, is positive in operation, and may also serve as an anchor for velocity restraining means during sonobuoy drops.

BRIEF DESCRIPTION OF DRAWINGS

The aforementioned objects and advantages of the invention will be appreciated from the following description and accompanying drawings wherein.

DESCRIPTION OF PREFERRED EMBODIMENT

Figure 1:
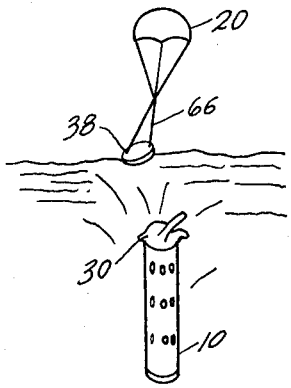
FIG. 1 is a view of a sonobuoy constructed in accord with the invention shortly after impact with the water, after release of the release plate, and during ejecting of the float envelope from the casing upper end.

A sonobuoy constructed in accord with the invention includes a casing 10, usually of a cylindrical construction, having a closed lower end 12 and an upper end 14. The lower end is provided with a weight or ballast 16, and, as will be appreciated from FIG. 5, the upper end 14 is initially enclosed by the parachute cover 18.

When air dropped, the sonobuoy cover 18 will be removed in a conventional way, such as by use of a shock cord, so that the parachute 20 may be deployed to restrain the fall of the sonobuoy toward the water.

Figure 4:
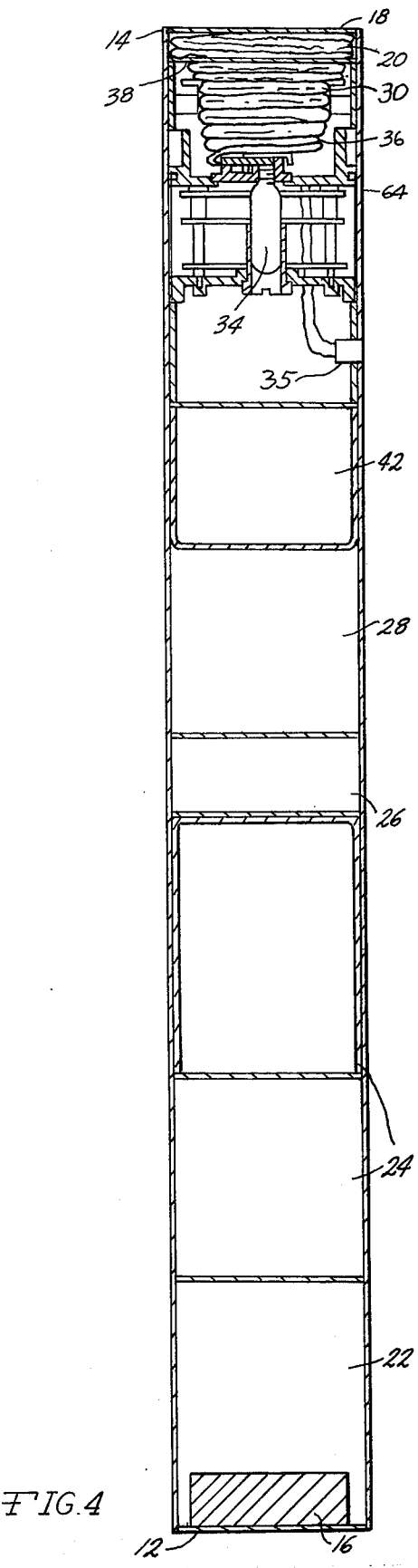
FIG. 4 is an elevational, diametrical, sectional view of a sonobuoy casing utilizing typical sonobuoy components, and incorporating release mechanism in accord with the invention.

The sonobuoy casing serves as a housing for a plurality of components, and in FIG. 4 such components are only schematically illustrated, and may include a transducer weight 22, a transducer 24, which may be both a transmitter and receiver, or merely a receiver, a housing 26 for electrical components, damping means 28, such as shown in U.S. Pat. No. 3,701,175, for damping the components against underwater movement due to underwater currents, and the like, a float envelope 30 and associated antenna and, of course, conductors and supports are interposed between the components to permit the signals ultimately received by the transducer 24 to be transmitted as radio signals from the float antenna.

The casing 10, adjacent its upper end 14, includes a portion constituting a float chamber 32, and a cylinder 34 of pressurized gas, or the like, communicates with the float envelope 30 for inflation thereof when energized.

The cylinder 34 is energized by suitable actuating means, such as a seawater battery activated explosive squib circuit 35, to produce inflation of the float envelope upon the sonobuoy casing contacting seawater.

The float assembly includes the float envelope 30 which is retained within its chamber 32 by a release plate 38 interposed between the float chamber and the parachute 20, and the construction of the release plate will be later described in detail.

The parachute 20 is attached to the sonobuoy assembly by anchors 40 affixed to the release plate 38 so that releasing of the plate 38 from the casing 10 also releases the parachute from the casing clearing the parachute from the sonobuoy and preventing entanglement of the parachute with the other sonobuoy components during deployment and operation.

In operation, the parachute cover 18 is removed as the sonobuoy casing falls from the aircraft. Thereupon, the parachute 20 is deployed and limits the velocity of the sonobuoy casing through the air to a speed which prevents damage of the sonobuoy upon impact with the water. As the parachute is located at the upper end of the sonobuoy casing, the lower end 12 of the sonobuoy will initially engage the water insuring proper distribution of the impact forces on the sonobuoy.

Figure 2:
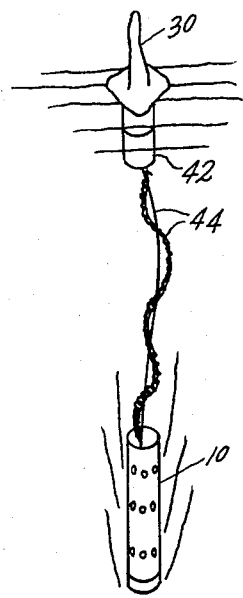
FIG. 2 illustrates the float and casing shortly after the float has been ejected therefrom, and as the casing is sinking.
Figure 3:
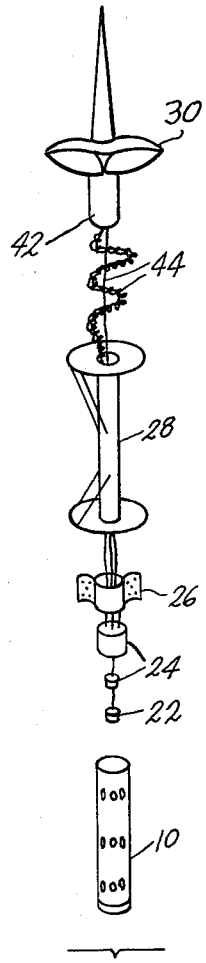
FIG. 3 illustrates a deployed sonobuoy wherein the components are suspended below the float, and the casing has released all of the components.
Figure 9:
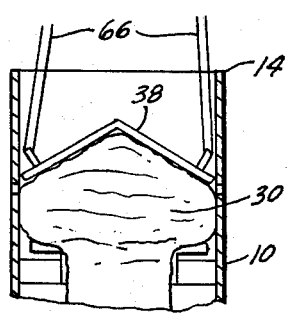
FIG. 9 is an elevational, sectional view of the casing upper end shortly after inflation of the float envelope occurs, as taken along Section IX—IX of FIG. 6.
Figure 10:
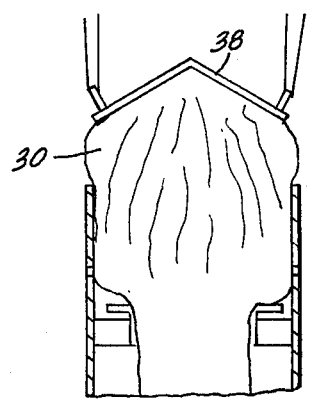
FIG. 10 is a view similar to FIG. 9 illustrating the relationship of components after complete ejection of the release plate from the casing.

A salt water activated battery circuit device 35 mounted in the side of the sonobuoy immediately detects submerging of the casing and energizes a circuit energizing the cylinder 34. Energizing of the gas cylinder causes the float envelope 30 to very rapidly inflate imposing a pressure on the underside of the release plate 38. This pressure exerted upon the release plate deforms the same as shown in FIG. 9, and such deformation causes the release plate to release from the casing, and further inflation of the float envelope forces the release plate from the casing upper end 14, FIG. 10, and "throws" the release plate, and the attached parachute away from the casing upper end. The float envelope therein completes inflation, and the heavier lower portion 42 of the float assembly will slide out of the casing upper end and orient the float in a manner apparent from FIG. 2.

Due to the negative buoyancy of the casing 10, the casing rapidly begins to fall away from the float assembly. As the casing falls, the compliant cables 44, connected to the float assembly, are deployed from the casing upper end and, as the casing descent continues, the sonobuoy components, such as the damper 28, electronics housing 26, transducers 24 and weight 22 are also slidably deployed therefrom through the upper end. Of course, the depth at which the components are deployed depends upon the length of the cables 44 and length of cables interconnecting adjacent components. Upon all of the components leaving the casing 10, the casing continues to fall to the ocean floor. The sonobuoy receiving and/or transmitting apparatus is then energized by known means, and the sonobuoy is in operating deployment and condition.

As the sonobuoy casing is of a smooth wall configuration, and is weighted, its descent through the water is rapid, and as the deployment of the components is at their desired operating depth, the deployment of the components does not interfere with the rate of descent of the casing, and the components may be deployed at the desired depths very quickly, as compared with deployment systems wherein the components are deployed through the bottom of the casing.

It will be appreciated that the release and operation of the release plate 38 must be positive and sure, and the construction of the release plate, and its connection to the casing, is best appreciated from FIGS. 5 through 10.

Figure 11:
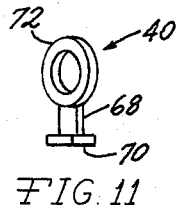
FIG. 11 is a perspective view of a parachute anchor.

The release plate 38 is of a flat configuration formed of sheet steel, and is of a generally circular configuration. Flats 46 are defined on the periphery 50 in diametrically opposed relationship, and locking tabs 48 located upon opposite sides of the periphery radially extend beyond the periphery. Each of the locking tabs 48 is divided into two parts by a radially disposed slot 52 intersecting the outer periphery of the associated tab. The purpose of the slots 52 is to receive the parachute anchors 40, FIG. 11. The plate 38 is provided with three elongated openings 54 aligned in diametrical relation to define a hinge line disposed across the plate in a manner perpendicularly disposed between an imaginary line connecting the slots 52. Also, this hinge line intersects and is perpendicular to the flats 46. Thus, the release plate 38 is divided into portions 56 and 58 interconnected by deformable hinge portions 60 of limited radial dimension.

Figure 8:
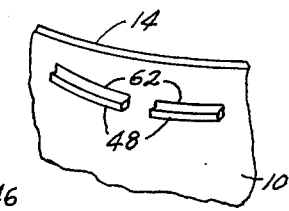
FIG. 8 is a detail, enlarged, perspective view of the release plate locking tabs and the casing openings receiving the same.

The casing 10 is provided with a pair of openings 62, FIG. 8 located adjacent the upper end in diametrically opposed relation for closely receiving the locking tabs 48. In order to insert the release plate tabs 48 into the openings 62 the release plate 38 may be bent slightly along the hinge line, to reduce the spacing between the locking tabs 48 and, upon the tabs being inserted into the proper openings 62, the release plate is returned to a planar configuration producing a positive intermeshing of the tabs 48 into the openings 62.

Figure 5:
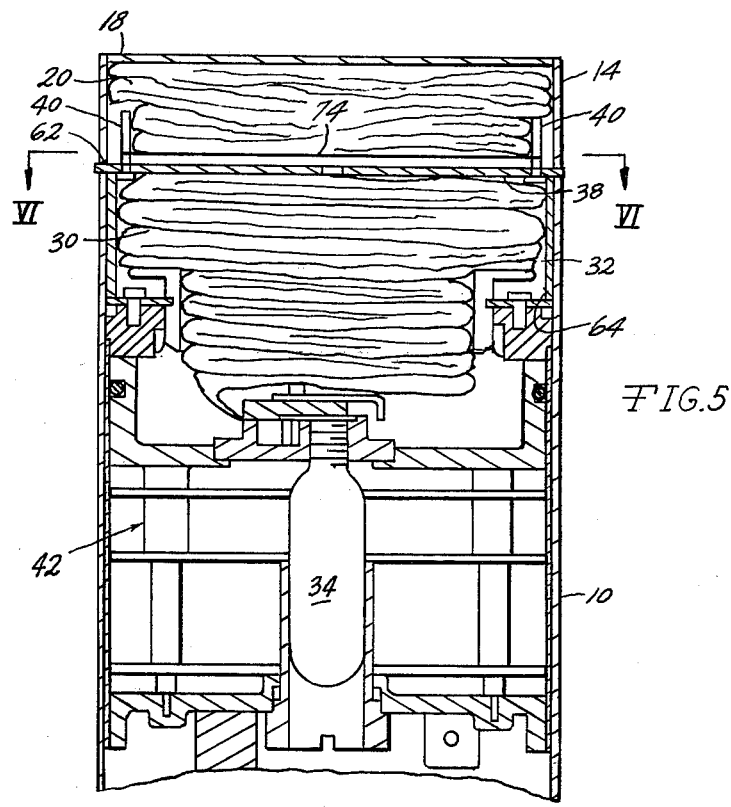
FIG. 5 is an enlarged, detail, elevational view of the upper end of the sonobuoy casing illustrating the release plate, parachute and float envelope.
Figure 6:
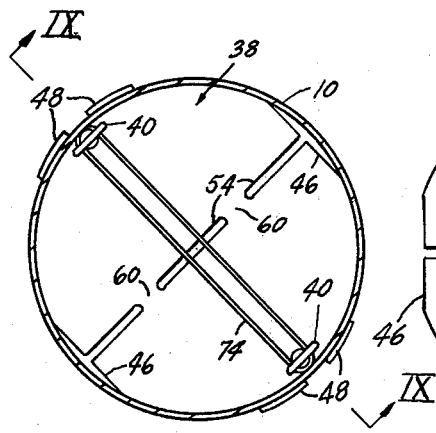
FIG. 6 is a top, plan, sectional view of the release plate as taken along Section VI—VI of FIG. 5.
Figure 7:
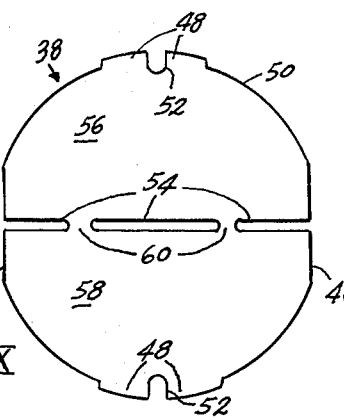
FIG. 7 is a plan view of the release plate, per se.

As will be appreciated from FIG. 5, the lower portion 42 of the float assembly includes a cylindrical shell slidably engaging the inside of the casing 10 and an independent cylinder shell 64 is disposed adjacent the underside of plate 38 between the plate and portion 42. Thus, as the engagement between the release plate 38 and the shell 64 is adjacent the periphery of the release plate only shear forces are imposed upon the locking tabs 48 and, thus, the release plate is capable of effectively resisting forces imposed upon the release plate by the portion 42 and shell 64. Likewise, the anchors 40, to which the parachute straps 66 are attached, are received within the slots 52 and also impose, primarily, shear forces upon the release plate tabs as the anchors are located adjacent the tabs.

The anchors 40 include a reduced neck 68 received within the slots 52 and resist being pulled from the slot by the enlarged head 70. The eyes 72 receive the parachute straps 66. Although the forces imposed upon the anchors are significant during descent of the sonobuoy through the air, particularly upon opening of the parachute, the proximity of the forces imposed upon the release plate 38 by the anchors 40 to the tabs 48 and openings 62 prevent significant bending forces from being imposed upon the central region of the release plate which would cause a bending of the release plate and disengagement of the tabs and openings. The anchors 40 are maintained within the slots 52 by a rubber band 74, FIG. 6, during assembly. After the release plate 38 is mounted within the casing openings 62, the inside of the casing will maintain the anchors 40 within their associated slots 52.

When the float envelope 30 is inflated the forces exerted on the underside of the release plate 38 are substantially uniformly disposed over the entire area of the plate underside, causing the plate to hinge and deform as shown in FIG. 9 by bending of hinge portions 60. Such deformation withdraws the tabs 48 from their associated openings 52, and the continued rapid inflation of the envelope 30 rapidly ejects the release plate through the upper end of the casing. The flattened portions 46 of the release plate reduce the dimension of the release plate at these locations assuring that no binding of the release plate occurs during the deformation and ejection thereof from the casing.

The release plate may be economically produced by a stamping operation of mild steel, and as will be appreciated from the foregoing description, its operation is positive and foolproof.

It is appreciated that various modifications to the inventive concepts may be apparent to those skilled in the art without departing from the spirit and scope of the invention.

I claim:

1. A sonobuoy component deployment system comprising, in combination, a nonbouyant casing having an open upper end and a permanently closed lower end, signal receiving and transmitting apparatus within said casing slidably removable therefrom through said upper end thereof, inflatable float means mounted in said casing adjacent said upper end slidably removable from said casing and located intermediate said casing upper end and said signal receiving and transmitting apparatus, flexible cable means connecting said apparatus to said float means of a length determining the operating depth of said apparatus, releasable retaining means mounted on said casing adjacent said upper end and intermediate said upper end and said float means retaining said float means and apparatus within said casing and permitting said float means and apparatus to deploy from said casing upper end upon said retaining means releasing from said casing, said inflatable float means being located adjacent said retaining means on the opposite side thereof with respect to said casing upper end, float inflating means within said casing for inflating said float means upon said casing being immersed, inflation of said float means releasing said retaining means from said casing wherein release of said retaining means from said casing permits said casing to fall below said float means and deploy said apparatus from said casing upper end at the operating depth of said apparatus.

2. In a sonobuoy component deployment system as in claim 1 wherein said retaining means comprises a deformable substantially flat plate having a periphery, and locking tabs outwardly projecting from said periphery received within openings defined in said casing, inflation of said inflatable float means deforming said plate and withdrawing said tabs from the associated casing openings.

3. In a sonobuoy component deployment system as in claim 2 wherein said deformable plate includes a weakened hinge line defined thereon intermediate said locking tabs to facilitate and control deformation of said plate.

4. In a sonobuoy component deployment system as in claim 3 wherein said hinge line comprises at least one elongated opening diametrically defined in said plate, the length of said opening being substantially perpendicular to a diameter interconnecting said locking tabs.

5. In a sonobuoy component deployment system as in claim 2, parachute anchor means defined on said plate, and a parachute anchored to said anchor means for retarding the rate of descent of said casing while falling through the atmosphere and released from said casing upon said plate releasing from said casing.

6. In a sonobuoy component deployment system as in claim 5 wherein said anchor means are located on said plate adjacent said plate periphery and said locking tabs.

7. A sonobuoy component deployment system comprising, in combination, a nonbouyant cylindrical casing having a substantially uniform diameter throughout its length, an open upper end, and a permanently closed lower end, signal receiving and transmitting apparatus removably housed within said casing slidably removable therefrom through said upper end thereof, inflatable float means removably mounted in said casing adjacent said upper end between said upper end and said apparatus, flexible cable means connecting said apparatus to said float means of a length determining the operating depth of said apparatus, retaining means releasably mounted on said casing adjacent said upper end retaining said float means and said apparatus in said casing and releasing said float means from said casing upon said casing being immersed, said inflatable float means being located adjacent said retaining means on the opposite side thereof with respect to said casing upper end, float inflating means within said casing for inflating said float means, casing immersion sensing means energizing said inflating means upon said casing being immersed, inflation of said float means releasing said retaining means and said float means from said casing wherein release of said float means from said casing permits said casing to fall below said float means and deploy said apparatus from said casing upper end at the operating depth of said apparatus.

8. In a sonobuoy component deployment system as in claim 7, a ballast weight mounted upon said casing adjacent said lower end.

* * * * *